United States Patent [19]

Subramanian et al.

[11] 4,201,648

[45] May 6, 1980

[54] NICKEL RECOVERY FROM SULFUR-DEFICIENT MATTES

[75] Inventors: Kojur N. Subramanian, East Hanover, N.J.; Norman C. Nissen, Oakville; John A. Thomas, Norval, both of Canada

[73] Assignee: The International Nickel Co., Inc., New York, N.Y.

[21] Appl. No.: 26,448

[22] Filed: Apr. 2, 1979

[30] Foreign Application Priority Data

Apr. 12, 1978 [CA] Canada .................................. 301006

[51] Int. Cl.² .............................................. C25C 1/08
[52] U.S. Cl. ..................................................... 204/112
[58] Field of Search ........................................ 204/112

[56] References Cited

U.S. PATENT DOCUMENTS

| 3,909,248 | 9/1975 | Ryan et al. ........................ 75/101 R |
| 3,975,190 | 8/1976 | Meulen et al. ..................... 75/101 R |
| 4,153,522 | 5/1979 | Arbiter et al. ...................... 204/112 |

OTHER PUBLICATIONS

"Dev. of Pressure Oxidation Leaching of High Grade Ni Matte" by G. Nakazawa et al., 3-1973.

*Primary Examiner*—R. L. Andrews
*Attorney, Agent, or Firm*—Ewan C. MacQueen

[57] ABSTRACT

A nickel matte in which the atomic ratio of S:(Ni+Co+Cu) is less than 0.7 is fragmented and slurried with water or an aqueous nickel sulfate solution to ensure that the S:(Ni+Co+Cu) ratio for the slurry as a whole exceeds 0.4, the slurry is heated under pressure in the presence of oxygen to form a basic nickel sulfate and the reacted slurry is treated with lime to convert the basic nickel sulfate to nickel hydroxide. The nickel hydroxide is then separated from gypsum by physical separation and thereafter dissolved in spent sulfate electrolyte to generate fresh electrolyte from which nickel can be electrowon.

8 Claims, 3 Drawing Figures

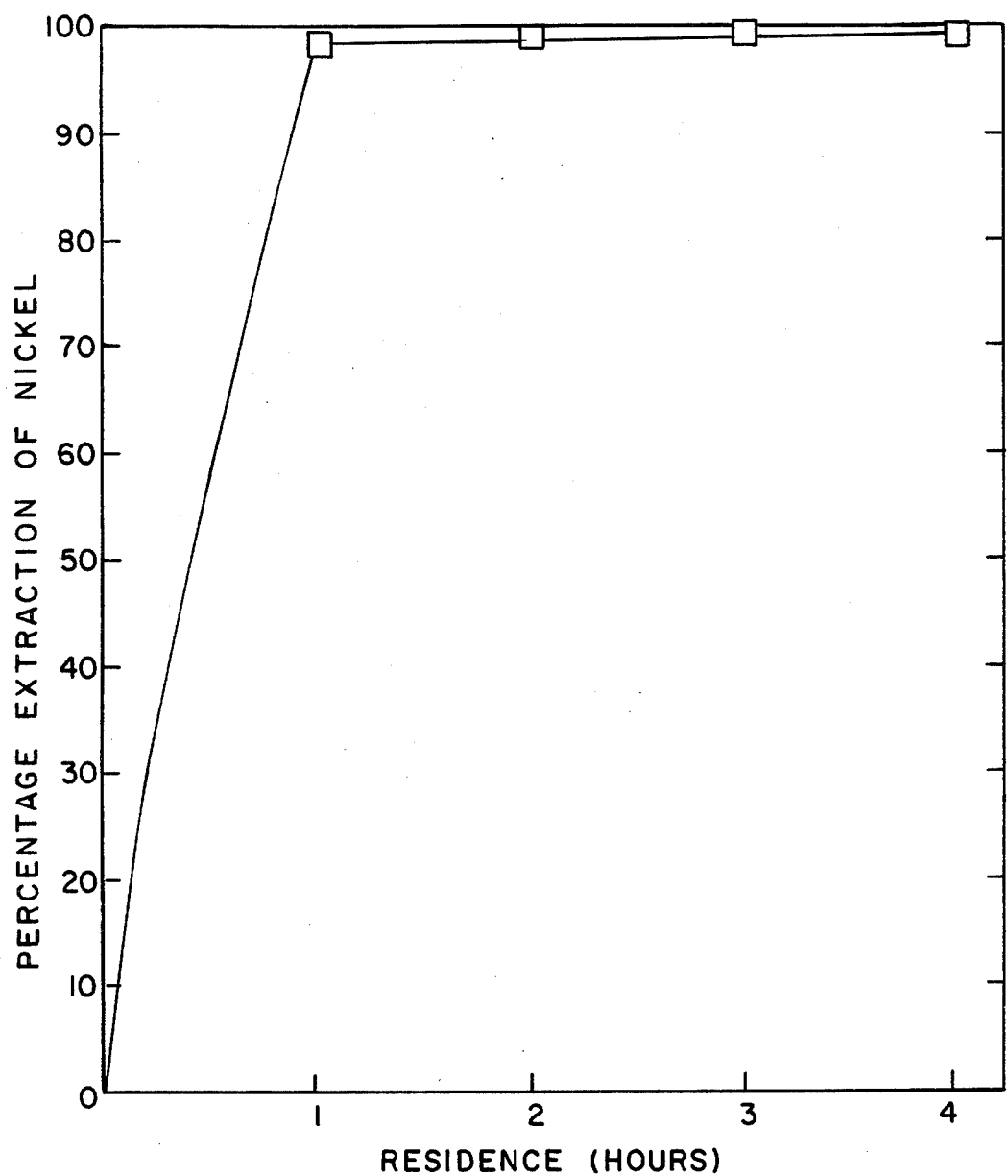
F I G. 1

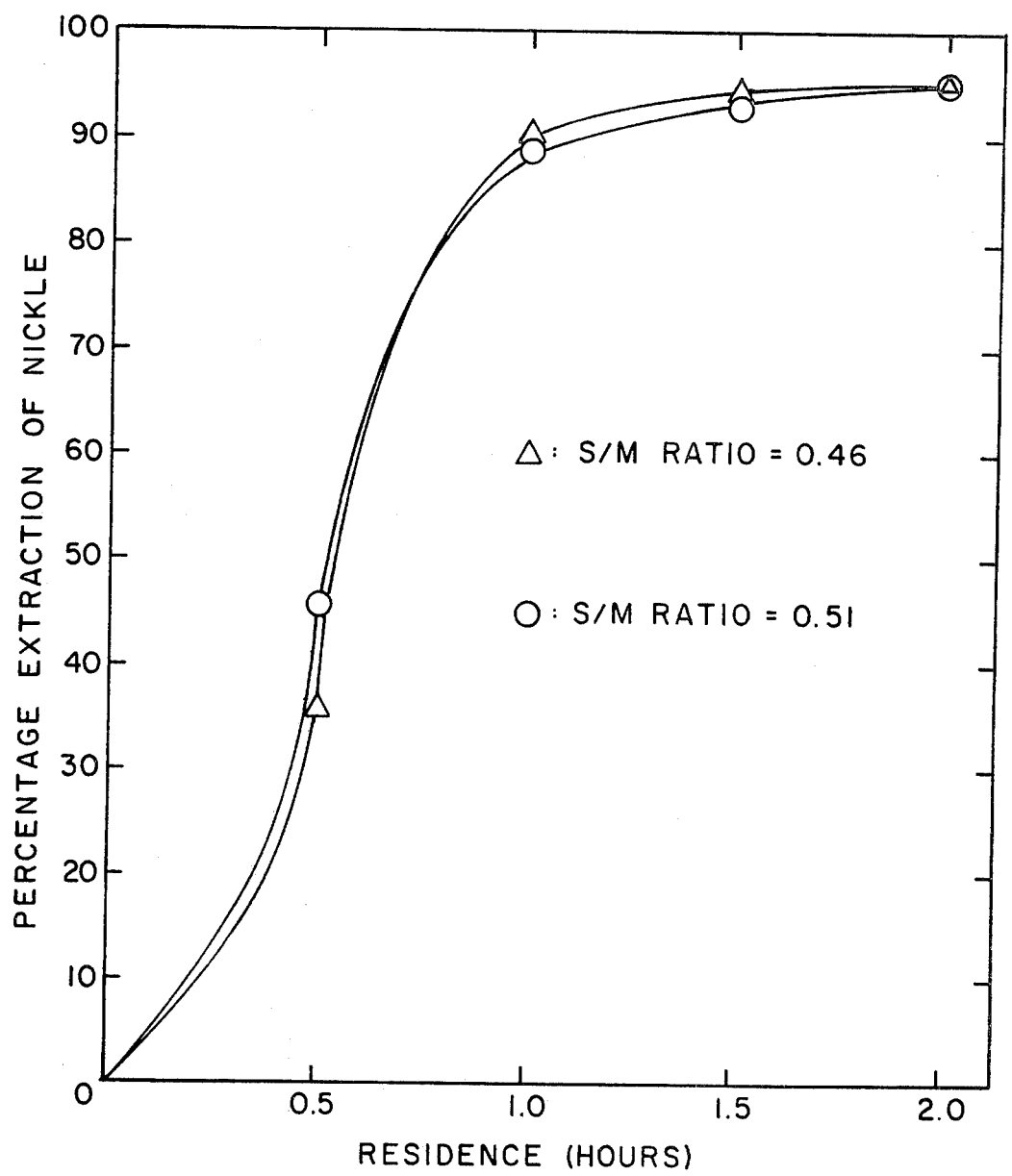
F I G. 2

NICKEL RECOVERY FROM SULFUR-DEFICIENT MATTES

FIELD OF THE INVENTION

The present invention relates to a hydrometallurgical process for recovering nickel electrolytically from nickel mattes which contain less sulfur than the amount corresponding to an atomic sulfur to nickel ratio of 0.7.

BACKGROUND OF THE INVENTION

The electrolytic recovery of nickel has been practiced by the alternative methods known as electrorefining and electrowinning respectively. Electrorefining involves the use of soluble anodes which may consist of metallic nickel or cast nickel matte. Matte anodes are fragile and leave residues upon dissolution, the handling of which contributes significantly to the cost of process. Metallic anodes, on the other hand, have been produced from nickel mattes pyrometallurgically by a roast-reduction treatment which is costly in terms of energy as well as pollution control measures which may be needed.

A more attractive scheme for treating mattes would be to leach the nickel therefrom and then recover it by electrowinning from solution. One such approach that has been advocated involves chloride leaching and electrowinning. Such a process has several disadvantages. Sulfur present in the matte results in hydrogen sulfide in the off-gases and chlorine is evolved during the electrowinning so that environmental problems are created. Moreover, unless prior roasting of the matte is undertaken, it is necessary to resort to concentrated hydrochloric acid and hence to corrosion resisting equipment.

Ammonia leaching has been used to dissolve the nickel from the matte and subsequently recover it. However, inherent difficulties of such a scheme are the environmental objections to ammonia, and the fact that the sulfur present in the matte reports as ammonium sulfate which has to be sold profitably in order for the process to be economically viable.

Sulfuric acid leaching of the matte has been widely studied as a first step to electrowinning the nickel from an all-sulfate solution. However, the cost of providing the acid needed, the corrosiveness of the leach medium and the possible evolution of hydrogen sulfide all detract from the commercial utility of a sulfuric acid leach. More recently two alternative schemes have been proposed to overcome the objections to the use of sulfuric acid. The first of these is described in a paper by: G. Nakazawa, A. Suetsuna and T. Shimogawara, entitled: "Development of the Pressure Oxidation Leaching of High Grade Nickel Matte", presented at the annular meeting of AIME at Chicago, March, 1973. The scheme described involves the addition of elemental sulfur to matte and subsequent leaching with water and oxygen in an autoclave. In this way, sulfuric acid is produced in situ by oxidation of the elemental sulfur added as well as sulfur in the feed. The authors recommend establishing an equiatomic ratio of sulfur to nickel by adding the appropriate amount of sulfur. They state, that the atomic ratio of S:Ni may be as low as 0.6 in which case a basic nickel sulfate is formed which they dissolve in sulfuric acid. However, their experimental results show that when they used an atomic S:Ni ratio of 0.66 the nickel extraction was only of the order of 42%.

A second alternative scheme to the use of sulfuric acid in the autoclave is described in U.S. Pat. No. 3,975,190 issued to Van der Muelen et al. In this case, the matte is slurried in a solution of ammonium sulfate, sodium sulfate or nickel sulfate and treated in an autoclave with oxygen at a pH of 4.5–6.5 to transform the nickel into a basic precipitate which is thereafter separated and then dissolved in sulfuric acid.

A drawback of both the Nakazawa et al. and the Van der Meulen et al. schemes is that neither of them provides a convenient manner for rejecting the sulfur initially present in the feed. In both cases most of the matte sulfur is fed to the electrowinning circuit as sulfate ions together with the nickel. Thus, in the case of the Nakawaza et al. scheme, sulfate corresponding not only to the matte sulfur but also to the added elemental sulfur would be fed to the electrowinning circuit with the nickel. On the other hand, Van der Meulen et al. describe the leach as resulting in a nickel hydroxide precipitate. However, in practice, this would not be the case, rather the nickel would be in the form of a basic nickel sulfate, thus containing a significant amount of the matte sulfur. If the subsequent dissolution of the precipitate is carried out with spent electrowinning electrolyte, the result will be that the electrolyte will not only be replenished with nickel, but also will increase in sulfate concentration. Because the electrowinning operation does not deplete sulfate from the electrolyte, any introduction of sulfate causes a build-up and necessitates a bleed which is costly to perform without introducing undesirable foreign ions into the electrolyte.

OBJECTS OF THE INVENTION

It is the object of the invention to provide an improved overall process for treating typical nickel converter mattes (i.e., mattes wherein the atomic ratio S:[Ni+Co+Cu] is less than about 0.7) hydrometallurgically without resorting to highly corrosive media.

It is a further object of the invention to provide such a hydrometallurgical process wherein no sulfur is added to the matte, and wherein essentially none of the sulfur initially present in the matte is transferred to the electrowinning circuit with the nickel.

SUMMARY OF THE INVENTION

According to the present invention, nickel is recovered from a nickel matte which contains up to 15% by wt. of cobalt, up to 5% by wt. of copper, and sulfur in an amount such that the atomic ratio S:[Ni+Co+Cu] is less than about 0.7 by a process comprising the steps of:

(i) fragmenting the matte to particles smaller than about 75 microns (μm) diameter;

(ii) forming a slurry of the fragmented matte in a medium which in the case of a matte wherein the atomic ratio S:[Ni+Co+Cu] is at least about 0.4 comprises water, and in the case of a matte wherein the atomic ratio S:[Ni+Co+Cu] is less than about 0.4 comprises a nickel sulfate aqueous solution of such concentration that the overall atomic ratio S:[Ni+Co+Cu] for the combination of matte and dissolved nickel sulfate is at least about 0.4;

(iii) heating the slurry in an autoclave at a temperature of at least about 140° C. under an oxygen partial pressure of at least about 0.1 megapascals (MPa), and withdrawing from the autoclave reacted slurry wherein the solids consist essentially of basic nickel sulfate and leach residue of unreacted matte;

(iv) treating the reacted slurry at a temperature of at least about 60° C. with lime to raise the pH to at least about 9.0 while agitating mildly to convert nickel in the slurry to fine particles of nickel hydroxide and precipitate large crystals of calcium sulfate;

(v) subjecting the lime-treated slurry to a physical separation effective to separate therefrom the slurry liquor and a coarse solids fraction, thereby isolating a fine solids fraction comprising essentially the nickel hydroxide and matte residue;

(vi) treating the fine fraction isolated in step (v) with spent sulfate electrolyte from a nickel electrowinning operation to dissolve the nickel hydroxide;

(vii) separating the matte residue from the solution obtained in step (vi); and (viii) subjecting the nickel sulfate solution separated in step (vii) to purification and thereafter to electrowinning to recover pure nickel therefrom.

DETAILED DESCRIPTION OF THE EMBODIMENTS

An important feature of the process of the invention is the control of the amount of sulfur present during the leaching operation in relation to the amounts of nickel, cobalt and copper present. Mattes in which the atomic ratio S:[Ni+Co+Cu] is at least 0.4 can be leached using simply water as the slurry medium. Indeed we have found that with such mattes any increase in the overall S:[Ni+Co+Cu] ratio produced by the presence of dissolved nickel sulfate in the slurry medium, gives no additional benefit in leach kinetics, whereas it entails a greater amount of sulfur to be rejected after the leach.

On the other hand we have found that when the S:[Ni+Co+Cu] atomic ratio in the matte is less than 0.4, attempts to leach the matte with just water and oxygen result not only in poor extractions but also in reacted slurries which are too viscous to be handled conveniently. For these mattes of particularly low sulfur content it is necessary to have dissolved nickel sulfate in the slurry medium so that for the combination of matte and dissolved nickel sulfate the S:[Ni+Co+Cu] atomic ratio is at least 0.4. A convenient method of providing this dissolved nickel sulfate in the slurry medium is to use a recirculated portion of the pregnant electrolyte produced in the later stages of the process, so that no "extraneous" sulfur is introduced into the system. Such an electrolyte will generally contain one or more sulfates other than nickel sulfate, e.g. sodium sulfate added to achieve a desired conductivity.

It should be pointed out however that where a sulfate other than nickel sulfate is present in solution, it should be ignored in calculating the sulfur ratio to determine whether it exceeds the critical value of 0.4. Thus where the slurry medium is a solution of nickel sulfate and sodium sulfate the critical sulfur ratio is not that calculated for the slurry as a whole, but rather for the combination of matte and dissolved nickel sulfate. This is because we have found that, contrary to the teaching of the above-mentioned Van der Meulen et al. patent, the sulfates of nickel and sodium are not interchangeable or equivalent to one another in such a process.

Since a nickel sulfate solution has equiatomic amounts of nickel and sulfur the critical factor to success of any leach in accordance with the invention, which shall be referred to herein for brevity as the "S/M ratio", can be defined as follows:

$$\text{S/M ratio} = \frac{S_{matte} + Ni_{sol}}{Ni_{matte} + Co_{matte} + Cu_{matte} + Ni_{sol}}$$

where:

$S_{matte}$, $Ni_{matte}$, ... are the numbers of gram-atoms of the respective element in the matte, and $Ni_{sol}$ is the number of gram-atoms of nickel in the solution.

For all leaches in accordance with the invention this S/M ratio will be at least 0.4 either by virtue of the matte composition or by virtue of the adjustment with dissolved nickel sulfate. Since the S/M ratio for the matte will not exceed 0.7, and since there is no benefit from adjusting the ratio to too high a value, the ratio will be between 0.4 and 0.7.

In general the slurry will be made up to a consistency of between 10 and 20% solids. (Unless otherwise specified, all percentages specified herein are percentages by weight). The solids in the slurry should be of sufficiently small particle size to enable rapid leaching. A particle size of minus 200 mesh (Tyler Screen Size) is satisfactory, i.e., particles smaller than about 75 μm but preferably particle size should be even smaller, e.g., 30 μm or less.

By controlling the sulfur to nickel ratio in this manner, the oxidation pressure leach is effected while avoiding highly acidic and highly alkaline conditions in the autoclave. Typically, the feed slurry to the autoclave is at a pH about 4.0–7.0, and the reacted slurry withdrawn from the autoclave is at a pH of about 5.0–6. The absence of highly corrosive conditions simplifies the choice of materials for the autoclave. The latter can therefore be chosen from many commercially available vessels useful for the temperatures and pressures of operation. The temperature at which the oxidation is carried out will be in the region of 140°–180° C., preferably 160° C. The pressure used will depend on whether a pure oxygen atmosphere or an oxygen-enriched atmosphere is used. In general, a partial pressure of 0.1–1.0 MPa, preferably 0.3–0.4 MPa, of oxygen will be maintained during the oxidation operation.

It is essential that the slurry obtained from the pressure oxidation operation be treated with lime to raise its pH to 9.0 or more, preferably about 10.6. This lime addition effects the decomposition of any nickel sulfate in solution and of the basic nickel sulfate which accounts for the major part of the nickel to be recovered. By carrying out the lime treatment at a temperature of 60° C. or more, e.g., 90° C., and with mild agitation, e.g., using air sparging, the decomposition results in calcium sulfate crystals which are much larger than the nickel hydroxide particles produced. As a result, the gypsum is readily separated from the nickel hydroxide by processes, such as screening or elutriation which rely on particle size difference.

The removal of the gypsum precipitate provides the means for rejecting essentially all of the sulfur in the feed prior to its reaching the electrowinning circuit. Moreover, the gypsum constitutes an environmentally acceptable way of rejecting that sulfur. Of course it will be understood that the amount of gypsum to be disposed of is less than half of what it would have been if the oxygen pressure leach had been carried out with equiatomic amounts of sulfur and nickel as advocated in the prior art.

When, as is common, the feed matte contains significant amounts of precious metals, the latter will be unaffected by the oxidation under pressure and will thus report in the leach residue. After the lime treatment and nickel hydroxide dissolution in spent electrolyte the matte residue is isolated by a solid-liquid separation and can thereafter be treated to recover the precious metals therefrom.

According to a preferred aspect of the invention, the autoclave oxidation in carried out as a one-step continuous process. We have discovered that such a continuous operation enables the conversion of 95-100% of the nickel in the matte to the basic sulfate form while using practicably short residence times, e.g., of the order of 1-2 hours. In contrast when oxidation is carried out in batch-manner, a conversion of 95% or more of the nickel to its basic sulfate may, depending on the precise matte composition, require a residence time of 9-10 hours in the autoclave.

We prefer that the lime decomposition step also be carried out in a continuous manner, by introducing the slurry to be treated, as well as, a lime slurry into a reactor, or preferably several series-connected reactors, and withdrawing it therefrom in such a way as to allow a retention time of the order of 2-4 hours overall, e.g., 1-1.5 hours in each of two reactors.

Some examples will now be described with reference to the accompanying drawings. In the description the term "leach" is used for convenience to describe the autoclave oxidation operation, despite the fact that such operation is not designed to bring about dissolution of most of the nickel in the matte as sulfate, but rather to convert it as well as any cobalt and copper present to a basic precipitate. Moreover, in discussing the leach kinetics and efficiency, reference is made herein to nickel "extraction", such term being used to denote the percentage of the nickel in the feed which is rendered acid-soluble by the oxidation leach.

BRIEF DESCRIPTION OF THE DRAWINGS

FIG. 1 is a graph depicting nickel extraction as a function of residence time in the autoclave when a nickel matte wherein the atomic ratio of S:[Ni+Co+Cu] was 0.23 was leached in accordance with the invention;

FIG. 2 is a graph of nickel extraction as a function of residence time in the autoclave, which illustrates the negligible effect on leach kinetics of using dissolved sulfate to increase the S/M ratio in the slurry when the matte to be leached has a S:[Ni+Co+Cu] atomic ratio of 0.43.

EXAMPLE 1

Figure 3:
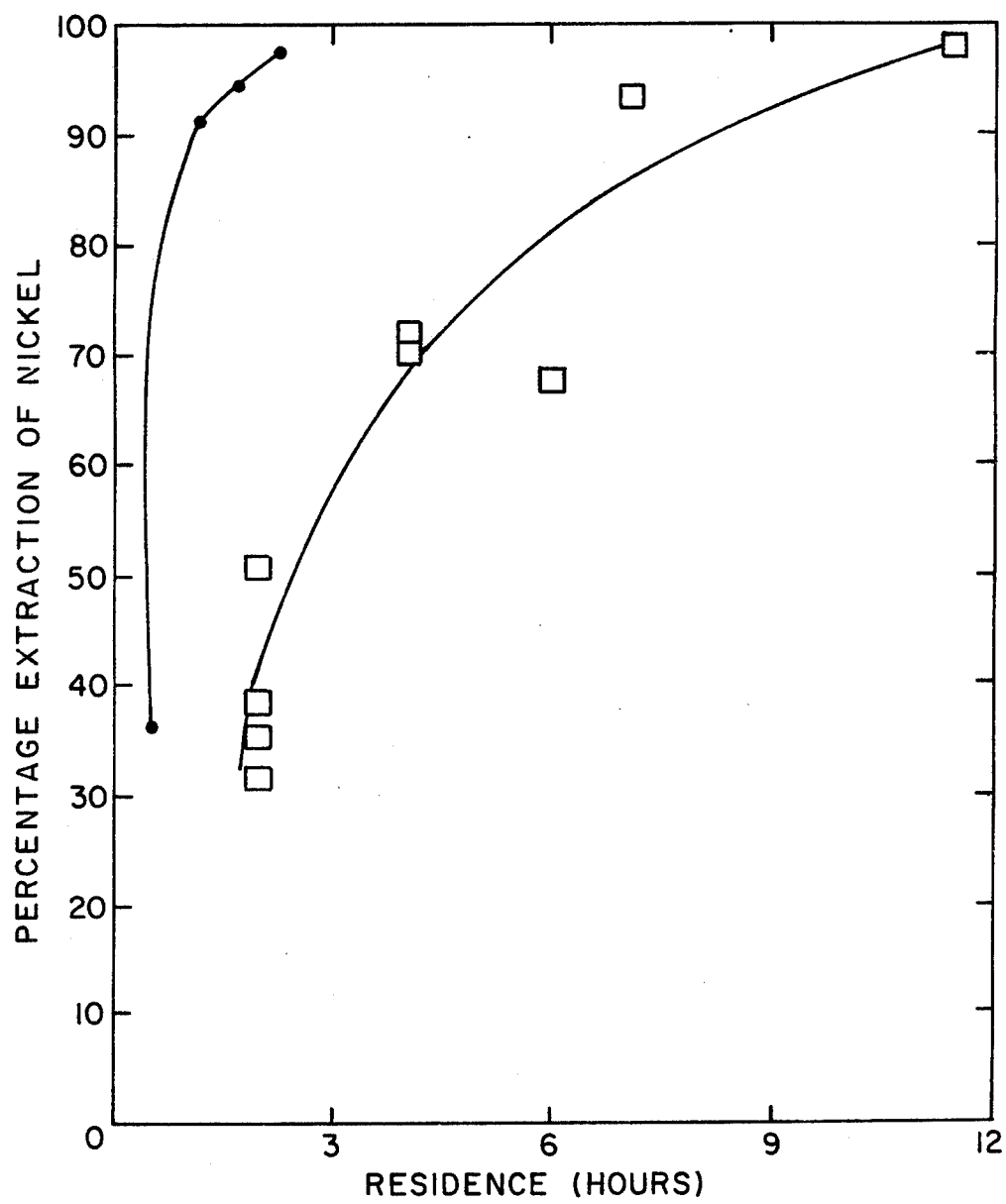
FIG. 3 is a graph of nickel extraction as a function of residence time in the autoclave, which illustrates the relative effectiveness of leaching conducted in batch and continuous modes.

A series of leaching tests were carried out on a matte which analyzed 84.5% Ni, 1.4% Co, 0.95% Fe, 0.26% Cu and 10.7% S, so that its S:[Ni+Co+Cu] atomic ratio was 0.23. The matte was screened to minus 200 mesh (Tyler Screen Size). The tests were all carried out in a continuous manner using an autoclave which comprised four compartments, each of 1.5 liter capacity. A slurry of this matte was fed into the four-compartment autoclave and withdrawn therefrom at such a rate as to provide a mean residence time of 4 hours in the autoclave. The slurry was maintained at 160° C. during the oxidation and pure oxygen fed into the autoclave to maintain an oxygen partial pressure of 0.7 MPa throughout the tests.

Three such tests were conducted under virtually identical conditions except for the medium used in making up the feed slurry, which in all three tests had a solids density of 140 grams per liter. In the first test water was used as the slurry medium. In the second test a solution simulating a pregnant electrolyte was used as the slurry medium; the solution contained 25 grams per liter of nickel as dissolved nickel sulfate and 8 grams per liter of sodium as dissolved sodium sulfate. In the third test a synthetic electrolyte was used as the slurry medium, the electrolyte in this case containing 40 grams per liter of nickel and 13 grams per liter of sodium in the form of dissolved sulfates. At the end of each test the slurry discharged from the autoclave was acidified to pH2 and assayed to determine the amount of nickel which remained undissolved.

In the first of these test where water was used so that the S/M ratio was the same as for the starting matte, i.e., 0.23, the slurry discharged from the autoclave was found to be extremely viscous, and the assays showed that only 79% of the nickel in the matte had been extracted. In the second test, where as a result of dissolved sulfate in the slurry medium the S/M ratio was 0.33, it was found that there was little improvement in either the viscosity of the slurry or the low level of nickel extraction. This test illustrates the reason for ignoring sodium sulfate in calculating the S:[Ni+Co+Cu] atomic ratio for the slurry. In fact if the sodium sulfate were taken into account the overall S:[Ni+Co+Cu] atomic ratio in the slurry as a whole would be 0.46. The unacceptable results show that it is not this ratio for the slurry as a whole, but rather the S/M ratio which takes account of only the dissolved nickel sulfate which is critical and must exceed 0.4.

The third test was in accordance with the present invention, inasmuch as the amount of dissolved sulfate in the slurry medium was sufficient to cause the S/M ratio to be 0.42. As a result it was found that the product discharged from the autoclave was far less viscous and the autoclave treatment resulted in virtually all of the nickel in the matte becoming acid soluble. FIG. 1 shows the kinetics of this leach as derived from samplings of the slurry during the course of the oxidation. The final results showed an extraction of 99% of the nickel into acid-soluble form, but it is clear from the graph of FIG. 1 that the residence time could have been reduced drastically while achieving substantially the same excellent extraction.

EXAMPLE 2

The feed matte used for this test was a Bessemer converter matte which analyzed: 73.9% Ni, 0.47% Co, 4.4% Cu, 1% Fe and 18.6% S, and its particle size distribution showed more than 85% thereof to be smaller than 26 μm. The matte was slurried with water to a consistency of 200 grams per liter and leached in the same apparatus as used in Example 1. The autoclave was maintained at 160° C. and a three hour residence time was allowed under an oxygen partial pressure of 0.35 MPa. At the end of this oxidation, assays showed the nickel distribution in the slurry to be as follows:
Nickel in leach solution: 9.2%
Nickel in solids:acid-soluble: 88.2%
Nickel in solids:acid-insoluble: 2.6%

Thus the three-hour autoclave treatment resulted in a nickel extraction of 97.4%. Moreover the autoclave discharge was found to have good handling properties. A repeat of the test with only two-hours of residence time allowed in the autoclave was found to give only slightly lower extraction than that reported above.

EXAMPLE 3

Two further leaching tests were conducted on the matte used in Example 2. The purpose of these tests was to determine the effect of artificially raising the S:[Ni+Co+Cu] ratio when leaching a matte which could be leached successfully with water. The two tests were conducted under the same conditions as described in Example 2 except that a two-hour residence time was allowed, and the slurry medium was a sulfate solution containing 7 grams per liter of nickel and 2.3 grams per liter of sodium in one of the tests and 27 grams per liter of nickel and 8.7 grams per liter of sodium in the other. Thus in these two tests the S/M ratio was 0.46 and 0.51 respectively. FIG. 2 shows the progress of the extraction in these two tests. It is clear that the leach kinetics for the two tests were similar to one another, moreover they did not differ markedly from those determined in the tests of Example 2 where only water was used. Thus for a matte wherein the atomic ratio of S:[Ni+Co+Cu] exceeds 0.4 there is little or no benefit to be obtained by artificially raising that ratio with dissolved sulfate.

EXAMPLE 4

A continuous leaching test was performed on a matte wherein the S:[Ni+Co+Cu] atomic ratio was 0.69. The matte, which was of minus 200 mesh (TSS) particle size, analyzed: 68% Ni, 0.8% Co, 0.6% Cu, 0.2% Fe and 26% S. Water was used to form a 125 grams of solids per liter slurry which was leached in the same autoclave as used in the previous examples, for 3 hours, at 160° C., under a 0.35 MPa partial pressure of oxygen.

Assays showed that a nickel extraction of 97% had been achieved. The majority of the nickel reported in the solids of the slurry discharged from the autoclave. X-ray diffraction revealed that the nickel was probably present as an oxysulfate having the formula $3NiO \cdot SO_3 \cdot 3H_2O$.

EXAMPLE 5

The matte having the composition given in Example 4 above was leached in a batch manner under conditions which were otherwise identical to those used in Example 4 except for the residence time. The batch test was carried for 4.5 hours after which acidification of the product slurry and assaying revealed that the nickel extraction achieved was only 78%, compared with 99.7% achieved in 3 hours using continuous leaching.

EXAMPLE 6

A continuous leach was carried out on a matte having a S:[Ni+Co+Cu] atomic ratio of only 0.11. The matte, which was of minus 200 mesh (TSS) particle size, analyzed: 88.5% Ni, 1.5% Co, 0.7% Cu, 0.45% Fe and 5.5% S. The matte was slurried, to a 125 grams of solids per liter consistency, with a sulfate electrolyte, such that the S/M ratio was 0.43 for the slurry. This slurry was then treated under pressure in the autoclave in an identical manner to that described in Example 4 above. At the end of the three-hour oxidation period it was determined that 97.7% of the nickel in the matte had been extracted into acid-soluble form.

EXAMPLE 7

A series of continuous leach tests and a series of batch-leach tests were carried out on the same matte and under virtually identical conditions with the exception of residence time. The matte used which was of suitable particle size, was one containing 77% Ni, 1.2% Co, 0.9% Cu, 1.1% Fe and 18.5% S. All of the tests were conducted on a slurry of that matte in water, the slurry having a consistency of 125 grams of matte per liter. Leaching was performed at 160° C. under a 0.35 MPa partial pressure of oxygen for periods of up to 2.5 hours in the case of continuous tests, and up to 12 hours in the batch-leaches.

FIG. 3 shows a plot of the nickel extraction achieved in the various tests, and clearly demonstrates the advantages of a continuous mode of leaching. Thus in order to achieve a 90% extraction of nickel, a residence time of about 8 hours is needed in a batch reaction, whereas a 1 hour residence is all that is needed in a continuous reaction.

EXAMPLE 8

The following test illustrates the effectiveness of sulfur rejection in the process of the invention. The slurry resulting from the autoclave oxidation of Example 2 was subjected to a lime decomposition in a continuous manner. The slurry in question contained solids which analyzed 42.8% Ni, 27.8% $SO_4^{--}$, in admixture with a solution containing 20 grams per liter of nickel and 32.7 grams per liter of sulfate. The slurry was fed in turn to two reactors in series with one another. Lime of commercial grade and minus 325 mesh (TSS) particle size was added to the reactors in the form of a 100 grams per liter slurry. The lime addition was controlled in such a way as to introduce into the first reactor 90% of the stoichiometric requirement for the sulfate present, while the lime addition to the second reactor was such as to ensure a pH of 10.6 for the discharge from that reactor. The flow rates were chosen to provide a retention of 1.5 hours in each reactor and mild agitation was used while maintaining the reactor temperature at 95° C.

The solids present in the product discharged from the second reactor were screened to separate a coarse (plus 100 mesh) fraction which was found to be essentially gypsum, and a fine fraction (minus 325 mesh) which was found to be essentially nickel hydroxide. The intermediate fraction represented only 4% or so of the solids screened. The assays showed that the fine fraction contained 96.4% of all the nickel present in the solids, and analyzed 51.0% nickel, 2.5% calcium and 6.8% sulfate. Since the entrained gypsum does not enter into solution when this fraction is dissolved in spent electrolyte, the latter is regenerated while increasing its sulfate content by only 1 gram for every 63.8 grams of nickel replenished.

EXAMPLE 9

A comparative test was carried out to determine whether the sulfur deficiency of a matte can be compensated for with the aid of sodium sulfate, rather than nickel sulfate, dissolved in the leach medium. The matte used for this test was the same matte as was used in the tests of Example 1, i.e., matte wherein the atomic S:(Ni+Co+Cu) ratio was 0.23. The matte was slurried with a 55.5 grams per liter solution of sodium sulfate, in an amount such that for the slurry as a whole the atomic S:(Ni+Co+Cu) ratio was 0.43.

The resulting slurry was subjected to a continuous pressure-oxidation in the same apparatus and under the same conditions of temperature and pressure as used in the tests of Example 1. After 6 hours of continuous flow through the autoclave, the viscosity of the slurry within the autoclave had become so high (>10 Poise) that the agitators were incapable to providing effective mixing, and temperature control provided by both internal coils and external resistance heaters proved erratic. Analysis of the solids in the reacted slurry showed that they contained almost no incorporated sodium (only 0.05% Na) and acid dissolution tests showed that only 74.4% of the nickel in the matte had been extracted by the pressure oxidation.

The above results can be contrasted with the results of the successful test (third test) described in Example 1. In the latter case there was sufficient nickel sulfate to provide a S/M ratio of 0.42 and that led to good viscosity and extraction. On the other hand, where the leach solution contained only dissolved sodium sulfate, the S/M ratio was only 0.23 (since that ratio is, by definition, unaffected by the presence of any dissolved sulfate other than nickel sulfate). Thus the test of Example 9 was not in accordance with the invention, and highlights the fact that the S:(Ni+Co+Cu) ratio which is a critical factor to success of the process is not the ratio for the slurry as a whole, but rather for the combination of matte and dissolved nickel sulfate, i.e., the S/M ratio.

While the present invention has been described with reference to preferred embodiments thereof, it is to be understood that various modifications may be made to the details of those embodiments without departing from the scope of the invention, which is defined by the appended claims.

We claim:

1. A process for recovering nickel from a nickel matte which contains up to 15% cobalt, up to 5% copper, and sulfur in an amount such that the atomic ratio S:[Ni+Co+Cu] is less that about 0.7, comprising the steps of:
   (i) fragmenting the matte to particles smaller than about 75 microns ($\mu$m) diameter;
   (ii) forming a slurry of the fragmented matte in a medium which in the case of a matte wherein the atomic ratio S:[Ni+Co+Cu] is at least about 0.4 comprises water, and in the case of a matte wherein the atomic ratio S:[Ni+Co+Cu] is less than about 0.4 comprises a nickel sulfate aqueous solution of such concentration that the atomic ratio S:[Ni+Co+Cu] for the combination of matte and dissolved nickel sulfate is at least about 0.4;
   (iii) heating the slurry in an autoclave at a temperature of at least about 140° C. under an oxygen partial pressure of at least about 0.1 megapascals (MPa), and withdrawing from the autoclave reacted slurry wherein the solids consist essentially of basic nickel sulfate and leach residue of unreacted matte;
   (iv) treating the reacted slurry at a temperature of at least about 60° C. with lime to raise the pH to at least about 9.0 while agitating midly to convert nickel in the slurry to fine particles of nickel hydroxide and precipitate large crystals of calcium sulfate;
   (v) subjecting the lime-treated slurry to a physical separation effective to separate therefrom the slurry liquor and a coarse solids fraction, thereby isolating a fine solids fraction which comprises essentially the nickel hydroxide and matte residue;
   (vi) treating the fine fraction isolated in step (v) with spent sulfate electrolyte from a nickel electrowinning operation to dissolve the nickel hydroxide;
   (vii) separating the matte residue from th solution obtained in step (vi); and
   (viii) subjecting the nickel sulfate solution separated in step (vii) to purification and thereafter to electrowinning to recover pure nickel therefrom.

2. A process as claimed in claim 1 wherein step (iv) is carried out by continuously feeding the reacted slurry and a lime slurry into at least one vessel and continuously withdrawing lime-treated slurry therefrom, the rates of feeding and withdrawal being such as to allow an overall residence time of at least 2 hours in the vessel or vessels.

3. A process as claimed in claim 2 wherein the amount of lime fed into the vessel or vessels is such as to ensure a pH of at least 10.6 in the lime-treated slurry.

4. A process as claimed in claim 3 wherein the lime treatment is carried out at a temperature of about 90° C., and the mild agitation is provided by bubbling a gas through the contents of the vessel or vessels.

5. A process as claimed in claim 1 wherein step (iii) is carried out by continuously introducing the slurry into the autoclave and continuously withdrawing the slurry therefrom.

6. A process as claimed in claim 5 wherein the rates of introduction and withdrawal of the slurry are such as to allow a residence time of at least one hour within the autoclave.

7. A process as claimed in claim 1 wherein step (iii) is carried out at a temperature of about 160° C. and an oxygen partial pressure of about 0.3–0.4 MPa.

8. A process as claimed in claim 1 wherein the nickel sulfate solution used as slurry medium in step (ii) comprises at least in part a recycled portion of the solution separated in step (vii).

* * * * *

UNITED STATES PATENT AND TRADEMARK OFFICE
CERTIFICATE OF CORRECTION

PATENT NO. : 4,201,648

DATED : May 6, 1980

INVENTOR(S) : Kojur N. Subramanian, Norman C. Nissen and John A. Thomas

It is certified that error appears in the above-identified patent and that said Letters Patent is hereby corrected as shown below:

Column 1, line 56 : "annular" should read -- annual --

Column 4, line 31 : insert before "about", the word -- of --

Signed and Sealed this

Sixth Day of December 1983

[SEAL]

Attest:

GERALD J. MOSSINGHOFF

Attesting Officer     Commissioner of Patents and Trademarks